United States Patent [19]

Krude

[11] Patent Number: 4,990,123
[45] Date of Patent: Feb. 5, 1991

[54] CONTINUOUSLY VARIABLE TRANSMISSION SYSTEM HAVING A VARIABLE DIAMETER PULLEY WITH RESILIENTLY BIASED BELT ENGAGING MEMBERS

[75] Inventor: Werner Krude, Oxford, Mich.

[73] Assignee: GKN Automotive, Inc., Auburn Hills, Mich.

[21] Appl. No.: 365,605

[22] Filed: Jun. 13, 1989

[51] Int. Cl.⁵ .................... F16H 11/00; F16H 7/08
[52] U.S. Cl. .................... 474/50; 474/110; 474/138
[58] Field of Search ............ 474/47, 49, 50, 52–57, 474/101, 109–111, 113, 117, 136, 138

[56] References Cited

U.S. PATENT DOCUMENTS

| | | | |
|---|---|---|---|
| 3,956,944 | 5/1976 | Tompkins | 474/54 X |
| 4,283,181 | 8/1981 | Sproul | 474/110 |
| 4,500,304 | 2/1985 | Foster | 474/138 |
| 4,714,452 | 12/1987 | Kumm et al. | 474/49 |

*Primary Examiner*—Thuy M. Bui
*Attorney, Agent, or Firm*—Remy J. VanOphem

[57] ABSTRACT

A continuously variable transmission system having a fixed variable diameter pulley connected by a drive belt to at least one other pulley. A tensioner pulley maintains the tension on the drive belt within predetermined limits as the effective diameter of the variable diameter pulley changes. The effective diameter of the variable diameter pulley is determined by a balance between a resilient force biasing a plurality of belt engaging members in a predetermined direction and a radial force acting on the plurality of belt engaging members in the opposite direction. In a first embodiment, the resilient force biases the plurality of belt engaging members outwardly and the radial forces are generated by displacing the tensioner pulley to increase the tension on the drive belt. In an alternate embodiment, the plurality of belt engaging members are biased inwardly by a resilient force and are displaced outwardly by centrifugal forces.

72 Claims, 8 Drawing Sheets

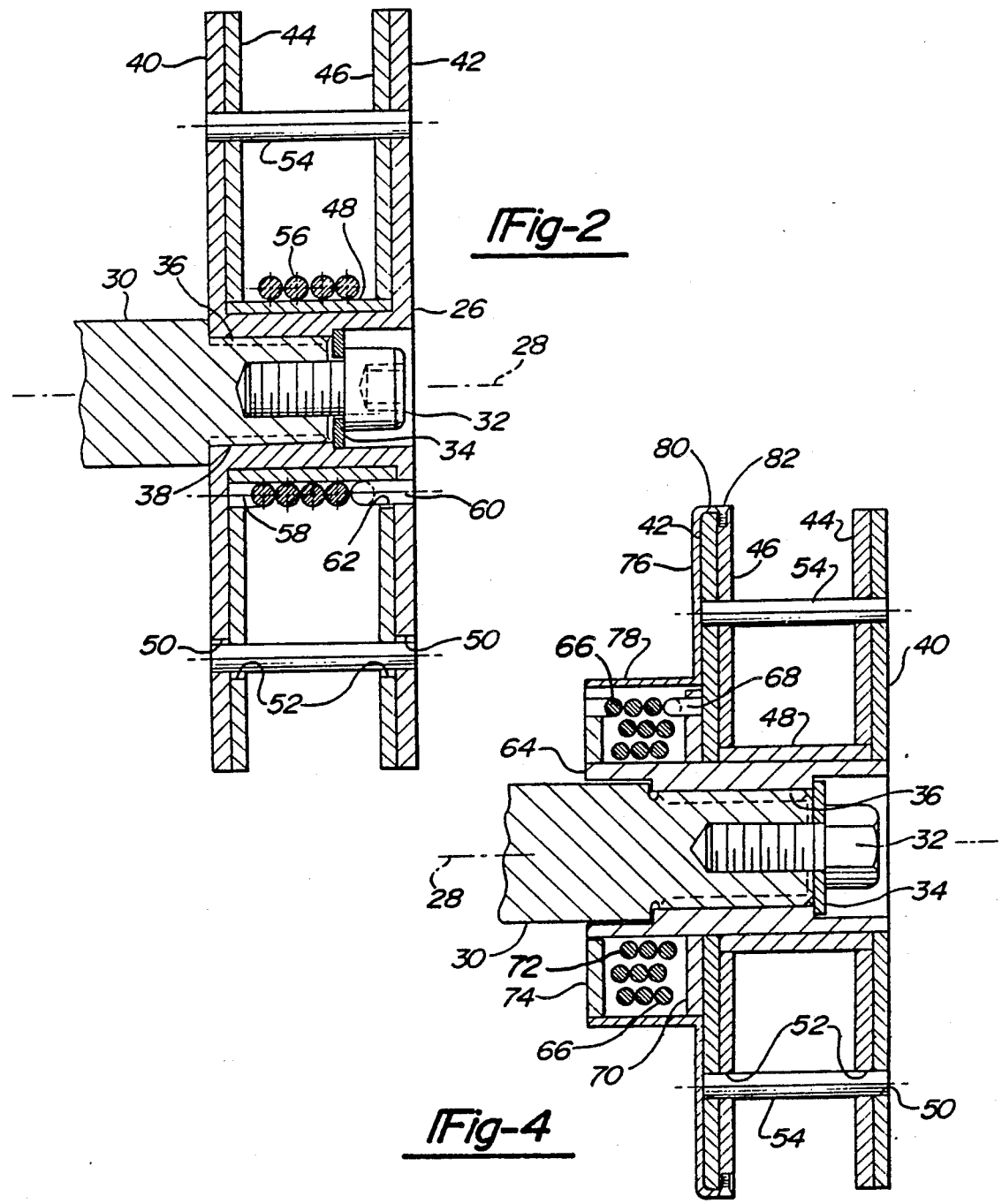

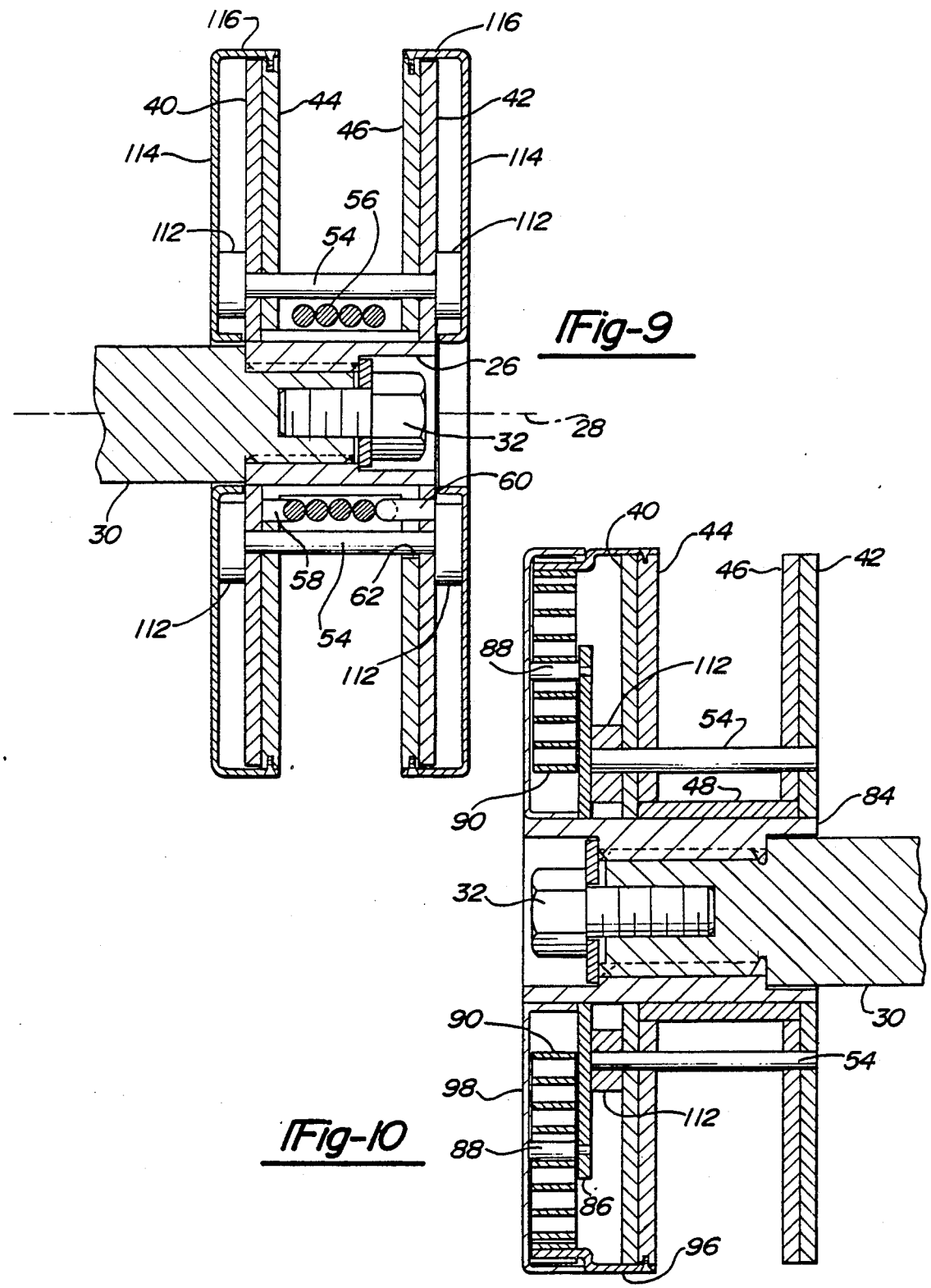

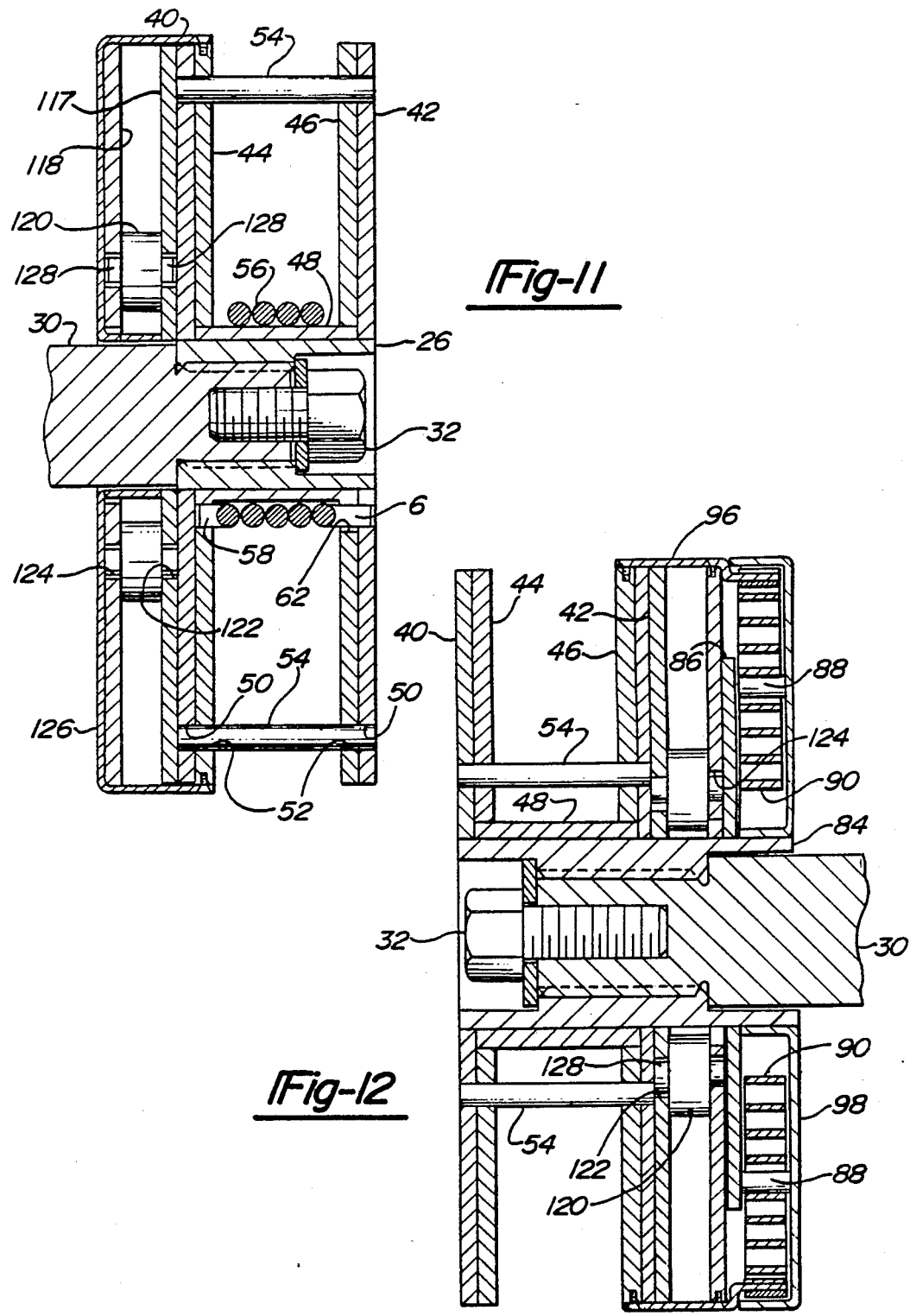

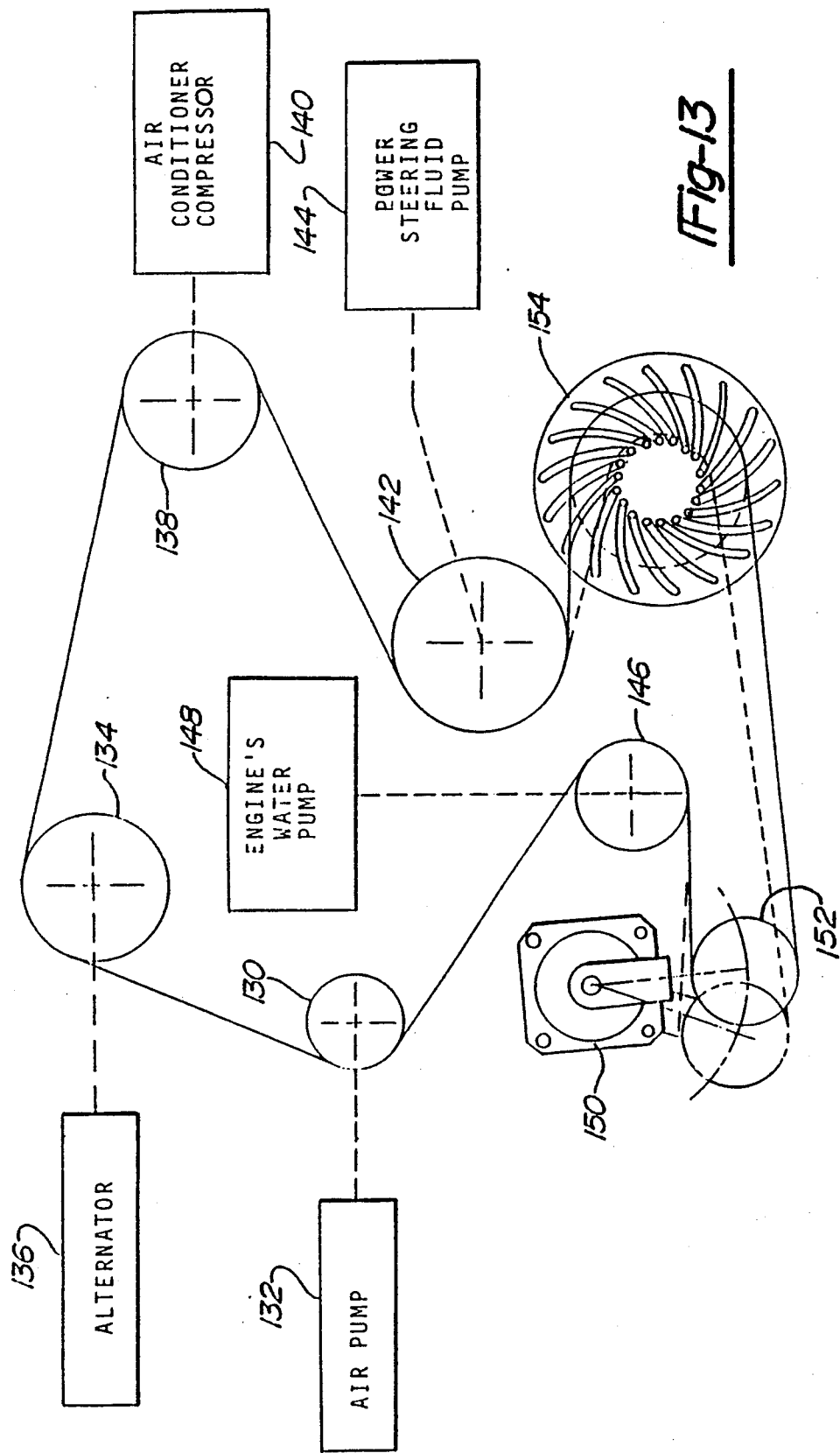

CONTINUOUSLY VARIABLE TRANSMISSION SYSTEM HAVING A VARIABLE DIAMETER PULLEY WITH RESILIENTLY BIASED BELT ENGAGING MEMBERS

CROSS-REFERENCE TO RELATED APPLICATION

This invention is related to my co-pending patent application Ser. No. 07/365,609 entitled "A Continuously Variable Transmission System", filed June 13, 1989.

BACKGROUND OF THE INVENTION

1. Field of the Invention

This invention is related to a continuously variable transmission system and, in particular, to a variable diameter pulley of the type having a plurality of resiliently biased belt engaging members disposed in a circular pattern about an axis of rotation.

2. Description of the Prior Art

Continuously variable transmissions of the class which may be broadly characterized as a transmission system in which a belt couples a pair of pulleys, at least one of which can assume a more or less continuous range of effective diameters, generally fall into two categories: (a) those systems employing V-belts or variations thereof (such as link belts or chains) for transmitting power from one pulley to the other; and (b) those systems employing flat, flexible belts between variable diameter pulleys.

Those skilled in the art have come to appreciate that continuously variable transmissions capable of using flat belts have significant fundamental advantages over those systems employing V-belts. In the case of the systems employing V-belts, the belts are composed of various compositions and have a generally trapezoidal cross section. The belts transmit rotary motion at one speed from a source of power, such as an engine or motor, to an output shaft which rotates at a different speed, the speed ratio between the input speed received from the source and the output speed being variable in a continuous fashion from a minimum to a maximum dependent on the geometry of the belt and the pulley system. The V-belt is compressed between smooth, conical facing surfaces in each of the two pulleys by external axial forces. These axial forces apply a compressive force on the sides of the belt to prevent slippage. In operation, a displacement caused by a change in the axial loading on the conical surfaces causes the V-belt to change its radial positions in the two pulleys until a force balance is achieved or a limit range stop is reached.

For large transmitted torque, the axial forces exerted on the facing conical surfaces produces large lateral compressive forces on the V-belt. This requires that the V-belt have a substantial thickness to prevent it from laterally collapsing. This thickness increases the centrifugal force acting on the belt and causes higher belt tension loads. In addition, as the belt thickness increases, the pulley size must be increased due to higher stress loads at a given minimum pulley radius. Further, the frictional forces acting on the sides of the V-belt tend to hold it to the facing conical surfaces, therefore, the V-belt must be continuously "pulled out" from between the conical surfaces upon leaving each of the pulleys. This results in significant friction losses and belt fatigue which adversely affects the overall efficiency of the V-belt system and its operating life. Consequently, although variable speed V-belt drives are being used in a wide variety of applications they are severely limited in their power transfer capabilities for small size equipment.

Because of these inherent drawbacks to the use of V-belts, the second category of continuously variable transmissions has been developed which is broadly designated as flat belt continuously variable transmissions. As the name suggests, flat belts may be employed between the driven and driving pulley assemblies which are dynamically variable in diameter to obtain the desired speed ratio changes. No axial movement between the two pulley rims is necessary, however, it is necessary to change the effective diameters of the individual pulley assemblies. In one particularly effective system, this change in the effective diameter is achieved by causing a circular array of belt engaging elements in each pulley to translate radially inwardly or outwardly in concert to change the effective diameter of the pulley assembly. Variable speed flat belt transmissions of this type and their associated control systems are disclosed in U.S. Pat. Nos. 4,295,836, 4,591,351, 4,714,452 and 4,768,996. In all but the first patent enumerated above, the variable diameter pulleys include a pair of pulley rims between which extend a series of belt engaging elements that are simultaneously moved in a radial direction to change the effective diameter of the pulley.

Each pulley assembly includes two rim elements which are made up of two pairs of disks (designated, respectively, the inner disk members and the outer disk members) which are concentric with each other and disposed immediately adjacent one another. Each of the adjacent disk members has a series of spiral grooves or guideways. The guideways of one of the disks are oriented in the opposite sense to the guideways of the other. The ends of the belt engaging elements are captured at the intersections of the spiral guideways of the two adjacent disks. Thus, radial adjustment of the position of the belt engaging elements may be achieved by a rotational displacement between the inner and outer disk members. This rotational displacement is, of course, carried out simultaneously and in coordination with the disk on the other side of the pulley assembly.

The mechanisms taught by the prior art cited above for establishing the mutual angular relationship between the inner and outer disk members has been relatively complex and expensive to manufacture. The present invention is directed to a variable diameter pulley in which the inner and outer disk members are resiliently biased relative to each other and changes in the effective diameter of the pulley are produced by changing the tension on the drive belt.

SUMMARY OF THE INVENTION

The invention is a continuously variable speed ratio transmission system having at least one variable diameter pulley and at least a second pulley, a drive belt connecting the at least a second pulley with the variable diameter pulley, and means for maintaining at least a minimum tension on the drive belt. The variable diameter pulley has a plurality of resiliently biased belt engaging members arranged in a circular pattern about an axis of rotation, the diameter of the circular pattern being the effective diameter of the variable diameter pulley. The belt engaging members of the variable diameter pulley are displaceable in a radial direction between a minimum and a maximum radial extent in response to tension forces to vary the effective diameter of the variable diameter pulley. The continuously variable transmission system also has means for changing the tension forces acting on the belt engaging members to change their position and thereby change the effective diameter of the variable diameter pulley.

One object of the invention is a continuously variable transmission system having a constant length drive belt connecting a variable diameter pulley to at least one fixed diameter pulley.

Another object of the invention is a continuously variable transmission system in which the effective diameter of the variable diameter pulley is variable as a function of the tension on the drive belt.

Another object of the invention is a continuously variable transmission system in which the effective diameter of the variable diameter pulley is a function of the rotational speed of the variable diameter pulley.

Another object of the invention is a variable diameter pulley in which the radial position of the belt engaging members is biased to a maximum position by a spring rotating adjacent disk members relative to each other.

Another object of the invention is a variable diameter pulley in which the radial position of the belt engaging members is biased to a minimum radial position by a spring rotating adjacent disk members relative to each other.

Another object of the invention is a variable diameter pulley in which weights are added to the belt engaging members to increase the centrifugal force displacing the belt engaging members outwardly as the rotational speed of the variable diameter pulley assembly increases.

Still another object of the invention is a variable diameter pulley in which centrifugal forces are used to rotate adjacent disk members relative to each other to radially displace the belt engaging members.

These and other objects of the invention will become apparent from a reading of the detailed description of the invention in conjunction with the drawings.

BRIEF DESCRIPTION OF THE DRAWINGS

FIG. 2 is a cross-sectional view of a first embodiment of the variable diameter pulley shown in FIG. 1;

FIG. 4 is a cross-sectional side view of a second embodiment of the variable diameter pulley shown in FIG. 1;

FIG. 9 is a cross-sectional side view of a first embodiment of the variable diameter-pulley shown in the continuously variable transmission system of Fig. 8;

FIG. 10 is a cross-sectional side view of a second embodiment of the variable diameter-pulley of the type used in the continuously variable transmission system of FIG. 8;

FIG. 11 is a cross-sectional side view of a third embodiment of the variable diameter pulley of the type used in the continuously variable transmission system of FIG. 8;

FIG. 12 is a cross-sectional side view of a fourth embodiment of the variable diameter pulley of the type used in the continuously variable transmission of FIG. 8; and FIG. 13 is a side view of a continuously variable transmission having multiple driven devices.

DETAILED DESCRIPTION OF THE PREFERRED EMBODIMENT

Figure 1:
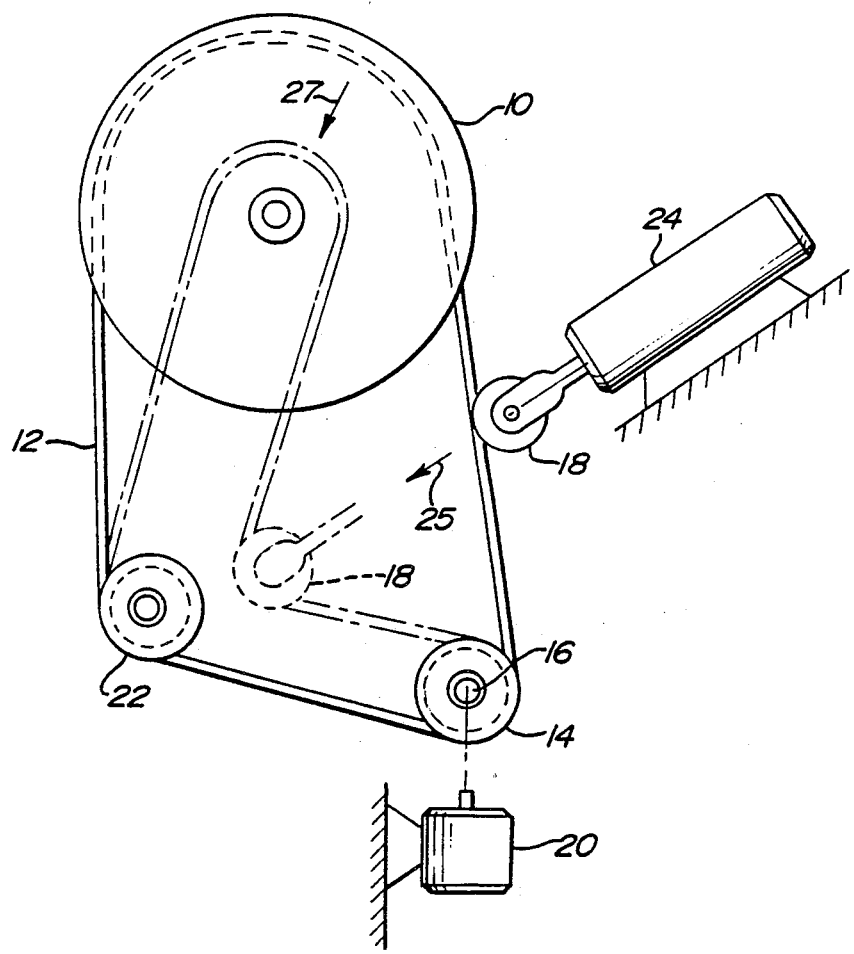
FIG. 1 is a side view of a first embodiment of a continuously variable transmission system.

A first embodiment of the continuously variable transmission system is shown in FIG. 1. In this embodiment, a variable diameter pulley 10 is driven by a source of rotary power, such as an internal combustion engine, an electric motor turbine or any other source known in the art. The variable diameter pulley 10 is shown in greater detail in FIG. 2 and is of the type taught by Kumm in U.S. Pat. No. 4,295,831, having a pair of inner and outer disk members supporting a plurality of belt engaging members in a circular pattern. The ends of the belt engaging members are received through the intersections of crossing guideways provided in adjacent inner and outer disk members. As taught by Kumm, the rotation of the inner disk members relative to the outer disk members changes the location of the intersection of the crossing guideways in a radial direction. Because the belt engaging members are received in the intersections of these guideways, they will be radially displaced when the adjacent inner and outer disk members are rotated relative to each other. Conversely, a change in the tension of the drive belt will produce a radial displacement of the belt engaging members which will rotate the inner disk members relative to the outer disk members. In the embodiment illustrated in FIG. 1, the inner disk members are resiliently biased to assume a predetermined rotational orientation or position relative to the outer disk members. In this predetermined rotational orientation, the plurality of belt engaging members are displaced to their maximum radial extent such that the circle formed by the belt engaging members has a maximum diameter.

A drive belt 12 transfers the rotational torque from the variable diameter pulley 10 to at least one other pulley such as fixed diameter pulley wheel 14 whose shaft 16 is connected to a rotary input of a driven device 20. Although only one fixed diameter pulley and one driven device are shown in FIG. 1, those skilled in the art will recognize that the drive belt 12 may be connected to two or more pulleys each connected to a separate driven device such as shown in FIG. 13. Referring back to FIG. 1, the pulley 14 may be mounted directly on the input shaft of the driven device 20, or may be connected to the input shaft of the input device 20 by means of gears, chains, universal drives or any other means known in the art.

The driven device 20 may be an alternator for an automotive vehicle, a hydraulic or pneumatic pump for power accessories, a compressor for an air conditioning unit, a compressor for a supercharging system, or any other type of device responsive to a rotary input.

The continuously variable transmission system has a tensioner pulley 18 and may include one or more idler pulleys such as idler pulley 22. The tensioner pulley 18 is connected to an actuator 24 which is operative to displace the tensioner pulley to change the path followed by the drive belt 12, which in turn increases the tension on the drive belt 12.

The operation of the continuously variable transmission system will be described relative to a typical automotive application in which the continuously variable pulley assembly is driven by an internal combustion engine and the driven device 20 is a fluid pump for power steering or power brakes. The fluid pump will normally have the maximum efficiency for a predetermined range of rotational speeds. The efficiency of the fluid pump decreases at rotational speeds below and above this predetermined range of rotational speeds. Therefore, it is desirable to have the diameter of the variable diameter pulley assembly have its maximum value at low engine speed such as the idle speed of the engine and a minimum value at highway speeds.

Referring now to FIG. 1, at low engine speeds, the tensioner pulley 18 is fully retracted by the actuator 24 and assumes a position which produces sufficient tension on the drive belt 12 to cause the pulley 14 to rotate with the rotation of the variable diameter pulley 10. In this state, the inner disk members of the variable diameter pulley 10 are resiliently biased to be rotated in a direction relative to the outer disk members which displaces the belt engaging members to their maximum radial extent. When the belt engaging members of the variable diameter pulley are at their maximum radial extent, the path of the drive belt 12 will be as shown in FIG. 1. Under these conditions, the effective diameter of the variable diameter pulley 10 is much larger than the diameter of the pulley 14. Therefore, the rotational speed of the input of the driven device or fluid pump 20 will be greater than the rotational speed of the variable diameter pulley and, therefore, will operate in a more efficient range.

As the engine speed increases, the rotational speed of the fluid pump increases until the speed of the fluid pump reaches a predetermined speed within its maximum efficiency range. A further increase in the engine speed will be detected by a control unit (not shown) which will actuate the actuator 24 to displace the tensioner pulley 18 in the direction of arrow 25 towards the position shown in phantom. This will increase the tension on the drive belt 12 and produce a radial force displacing the belt engaging members of the variable diameter pulley inward as indicated by arrow 27. This reduces the effective diameter of the variable diameter pulley 10 so that the ratio between the rotary speed of the variable diameter pulley and the rotary speed of the fluid pump decreases. Preferably, within the limits of the continuously variable transmission, the rotational speed of the fluid pump 20 is maintained within its most efficient operating range over a much wider range of engine speeds than is available when both pulleys have fixed diameters.

It is recognized that if the driven device 20 is of the type that, due to inertia, represents to the power source a large starting load, such as the transmission of a vehicle, the initial position of the actuator 24 may be the extended position shown in phantom in FIG. 1 so that the ratio between the rotational speed of the variable diameter pulley 10 and the rotational speed of the fixed diameter pulley 14 has its minimal value. The actuator 24 may then be retracted towards the position shown after the starting inertia forces are overcome by the continuously variable transmission system.

It would also be apparent to those skilled in the art that the elements of the continuously variable transmission system may be reversed so that the variable diameter pulley 10 is connected to the driven device 20 and the source of rotary power is connected to the fixed diameter pulley 14.

Referring now to FIG. 2, there is shown a first embodiment of the variable diameter pulley 10 discussed relative to FIG. 1. The variable diameter pulley has a hub 26 having an axis of rotation 28. The hub 26 is connected to a shaft 30 which may be an input shaft connected to a source of rotary power or an output shaft connected to a driven device as discussed relative to FIG. 1. The hub 26 is attached to the shaft 30 by means of a bolt 32 and a washer 34. Mating splines 36 and 38 provided on the internal surface of the hub 26 and the external surface of the shaft 30 lock the hub 26 to the shaft 30 for rotation therewith.

A pair of spatially separated outer disk members 40 and 42 are fixedly attached to the hub 26 normal to the hubs axis of rotation. A pair of inner disk members 44 and 46 are attached to a spacer sleeve 48 which circumscribes the hub 26 and is rotatable relative thereto. The inner disk member 44 is parallel to the outer disk member 40 and is adjacent thereto. Likewise, the inner disk member 46 is parallel to the outer disk member 42 and adjacent thereto.

Figure 3:
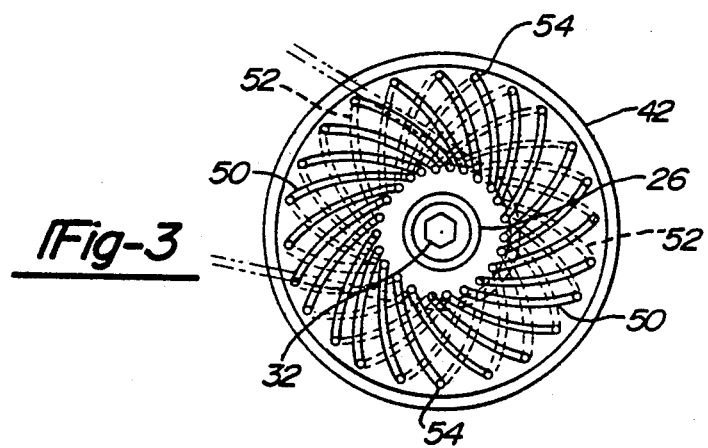
FIG. 3 is a side view of the variable diameter pulley showing the details of the first and second guideways.

As shown in FIG. 3, the outer disk member 42 has a plurality of guideways 50 which extend radially and which spiral outwardly in a first direction while the inner disk member 46 has a like plurality of guideways 52 which also spiral outwardly but are curved in a second direction, opposite the first direction. The outer disk member 40 has a like plurality of guideways 50 and the inner disk member 44 also has a like plurality of guideways 52.

The guideways 52 of the inner disk members 44 and 46 cross the guideways 50 of the outer disk members 40 and 42, respectively, and form a plurality of through apertures in a circular pattern concentric with the hub's axis of rotation 28. A plurality of belt engaging members 54 disposed parallel to the hub's axis of rotation have their opposite ends supported in the through apertures formed by the intersections of the crossing guideways 50 and 52. As is apparent from FIG. 2, the rotation of the inner disk members 44 and 46 relative to the outer disk members 40 and 42 will cause the location of the intersection of the guideways 50 and 52 to move in a radial direction and, therefore, move the location of the belt engaging members 54 which are supported in the through apertures formed by these intersections.

Referring back to FIG. 2, a coil spring 56 circumscribes the spacer sleeve 48. A first end 58 of the coil spring 56 is received in an aperture provided in the inner disk member 44 and the opposite end 60 is received in an aperture provided in the outer disk member 42. The opposite end 60 of the coil spring 56 passes through an arcuate slot 62 provided through the inner disk member 46. The length of the arcuate slot 62 is selected to permit the inner disk members 44 and 46 to rotate relative to the outer disk members 40 and 42 through an angle sufficient to displace the belt engaging members 54 from their outermost radial extent to their innermost radial extent and vice versa. The coil spring 56 is prewound at assembly to produce a rotational force or torque on the inner disk members 44 and 46 in a direction which will displace the belt engaging members 54 to their outermost radial position and with a force sufficient to retain the desired tension on the drive belt 12.

As the tension on the drive belt 12 increases due to the displacement of the tensioner pulley 18 as discussed relative to FIG. 1, the forces acting on the belt engaging members 54 will exceed the forces produced by the coil spring 56. When this happens, the belt engaging members will be displaced radially inwardly causing the inner and outer disk members to rotate relative to each other against the force of the coil spring 56. Effectively, the belt engaging members 54 will be displaced inwardly until the forces produced by the drive belt 12 are equal to the counterforces produced by the coil spring 56. The spring rate of the coil spring 56 is selected to maintain the maximum tension forces on the drive belt within operational limits as the belt engaging members are displaced towards their innermost positions.

In order to maintain the tension on the drive belt 12 at a more constant value, the coil spring 56 may be external to the region between the inner and outer disk members as shown in FIG. 4. In this embodiment, a hub 64 is attached to the shaft 30 by means of the bolt 32 and washer 34 and mating splines 36 and 38 as described relative to the embodiment shown in FIG. 2. The variable diameter pulley 10 has a pair of outer disk members 40 and 42 attached to the hub 64 and a pair of inner disk members 44 and 46 which are attached to the spacer sleeve 48. The spacer sleeve 48, as previously described, circumscribes the hub 64 and is rotatable relative thereto.

A multi-layered coil spring 66 circumscribes the hub 64 outside the region between the outer disk members 40 and 42. The coil spring 66 may be disposed to the left of the outer, disk 40 as shown or may be disposed to the right of the outer disk member 42 as would be readily obvious to one skilled in the art. A first end 68 of the coil spring 66 is received in an aperture provided in a hub flange 70 which is attached to the hub 64. Alternatively, the first end 68 may be received in an aperture provided in the outer disk member 42 and the hub flange 70 may be omitted. The opposite end 72 of the coil spring is received in an aperture provided in an annular disk 74 rotatably circumscribing the hub 64. An annular flange 76 has a cylindrical portion 78 and a rim portion 80. The cylindrical portion 78 is attached to the annular disk 74 and the rim portion 80 is attached to the inner disk member 46 using a plurality of fasteners, such as screws 82, or by any other method known in the art.

As shown in the embodiment of FIG. 2, the outer disk members 40 and 42 have a plurality of guideways 50 as shown in FIG. 3. The inner disk members 44 and 46 each have a plurality of guideways 52 that cross the plurality of guideways 50 and the belt engaging members 54 have their ends received in the apertures formed at the locations where the guideways 50 and 52 cross each other. The coil spring 66 is prewound and produces a rotational force biasing the inner disk members 44 and 46 to rotate relative to the outer disk members 40 and 42 in a direction displacing the belt engaging members to their outermost radial positions.

As discussed relative to the embodiment shown in FIG. 2, the displacement of the tensioner pulley 18 will increase the tension on the drive belt producing a radial force on the belt engaging members 54, urging them inwardly to change the effective diameter of the variable diameter pulley 10.

Figure 6:
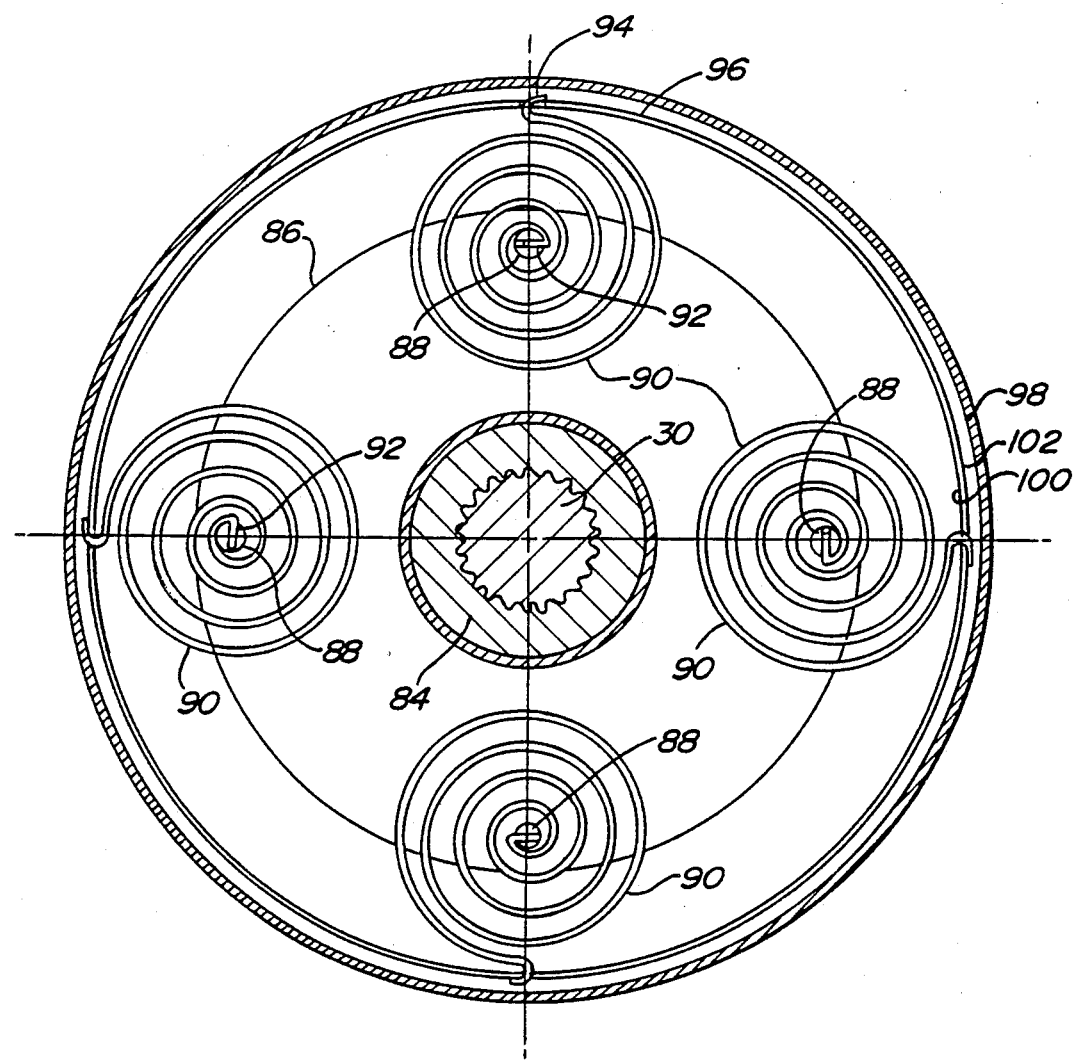
FIG. 6 is a cross-sectional view of the third embodiment of the variable diameter pulley shown in FIG. 5 taken in the direction of section arrows 6—6.
Figure 5:
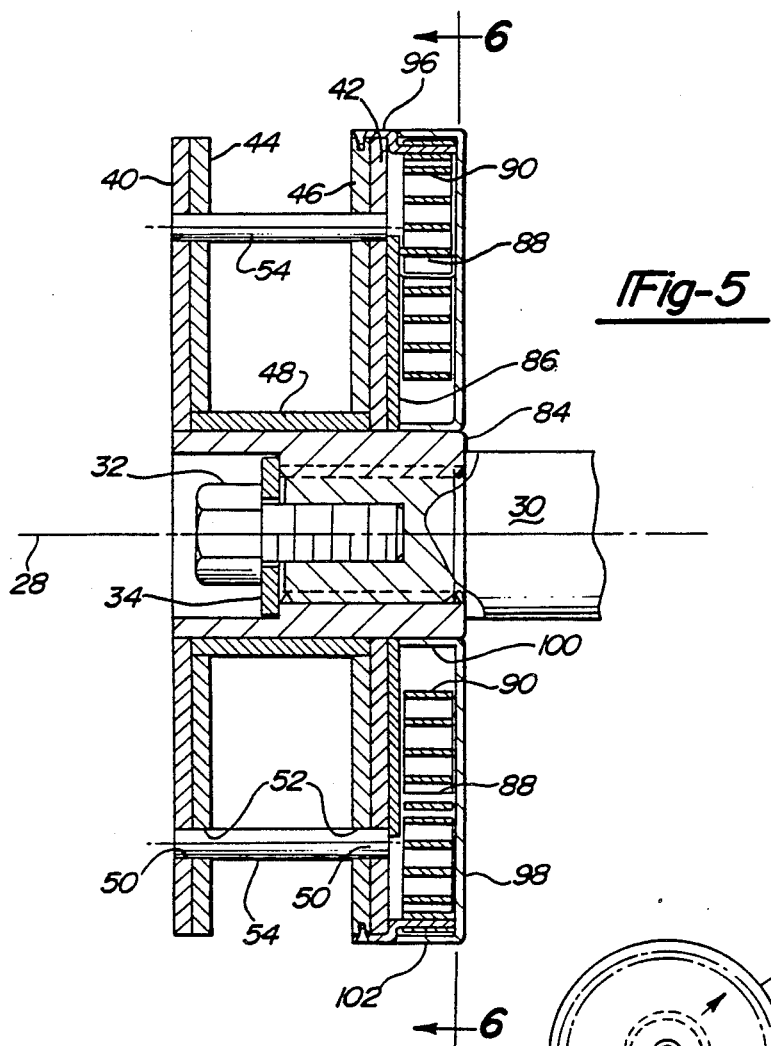
FIG. 5 is a cross-sectional side view of a third embodiment of the variable diameter pulley shown in FIG. 1.

A different embodiment of the variable diameter pulley 10 is shown in FIGS. 5 and 6. In this embodiment, the outer disk members 40 and 42 are connected to a hub 84 and the inner disk members 44 and 46 are connected to the spacer sleeve 48. The outer and inner disk members each have a plurality of radially extending guideways 50 and 52 as previously described. The ends of the belt engaging members 54 are received in the through apertures formed at the intersections of the plurality of guideways 50 and 52 and lie along a circular pattern concentric with the axis of rotation 28 of the hub 84. An annular spring flange 86 is attached to the hub 84 and is rotatable therewith. A plurality of spring posts 88 are attached to the spring flange 86. As shown more clearly in FIG. 6, the spring posts 88 are arranged in a cruciform pattern concentric with the axis of rotation 28 of the hub 84 and support a plurality of spiral springs 90. A mounting tab 92 is formed at the internal end of each spiral spring 90 which is received in a slot provided in the ends of the spring posts 88. A hook 94 is provided at the other end of the spiral spring 90 which is received in a slot provided in a torque rim 96. The torque rim 96 is attached to the periphery of the inner disk member 46 and is rotatable therewith.

Although the illustrated embodiment has four spiral springs arranged in a cruciform pattern symmetrical about the hub's axis of rotation 28, the number of spiral springs may differ depending upon the application and the magnitude of the torque to be transmitted from the variable diameter pulley to the driven device or vice versa.

An annular cover 98 has an inner rim 100 attached to the hub 84 and an outer rim 102 which extends over the torque rim 96. The annular cover 98 engages the ends of the spring posts 88 opposite the ends attached to the spring flange 86 preventing the axial displacement of the spiral springs and the disengagement of the mounting tabs 92 from the slots provided in the ends of the spring posts 88. The annular cover also serves as a shield protecting the spiral springs 90 from dirt or physical damage. The spiral springs 90 are prewound and produce a force biasing the inner disk members 44 and 46 to rotate in a direction relative to the outer disk members 40 and 42 which will displace the belt engaging members to their outermost radial extent in the same manner as the coil springs 56 and 66 discussed relative to FIGS. 2 and 4.

As in the previous embodiments, increasing the tension on the drive belt 12 by the tensioner pulley 18 increases the tension on the drive belt which produces a radial force acting on the belt engaging members 54, displacing them inwardly to reduce the effective diameter of the variable diameter pulley. The inward displacement of the belt engaging members 54 causes the inner disk members 44 and 46 to rotate relative to the outer disk members 40 and 42 in a direction counter to the rotational forces provided by the spiral springs 90. The radial position of the belt engaging members is determined by the tension on the drive belt 12 produced by the tensioner pulley 18.

Figure 7:
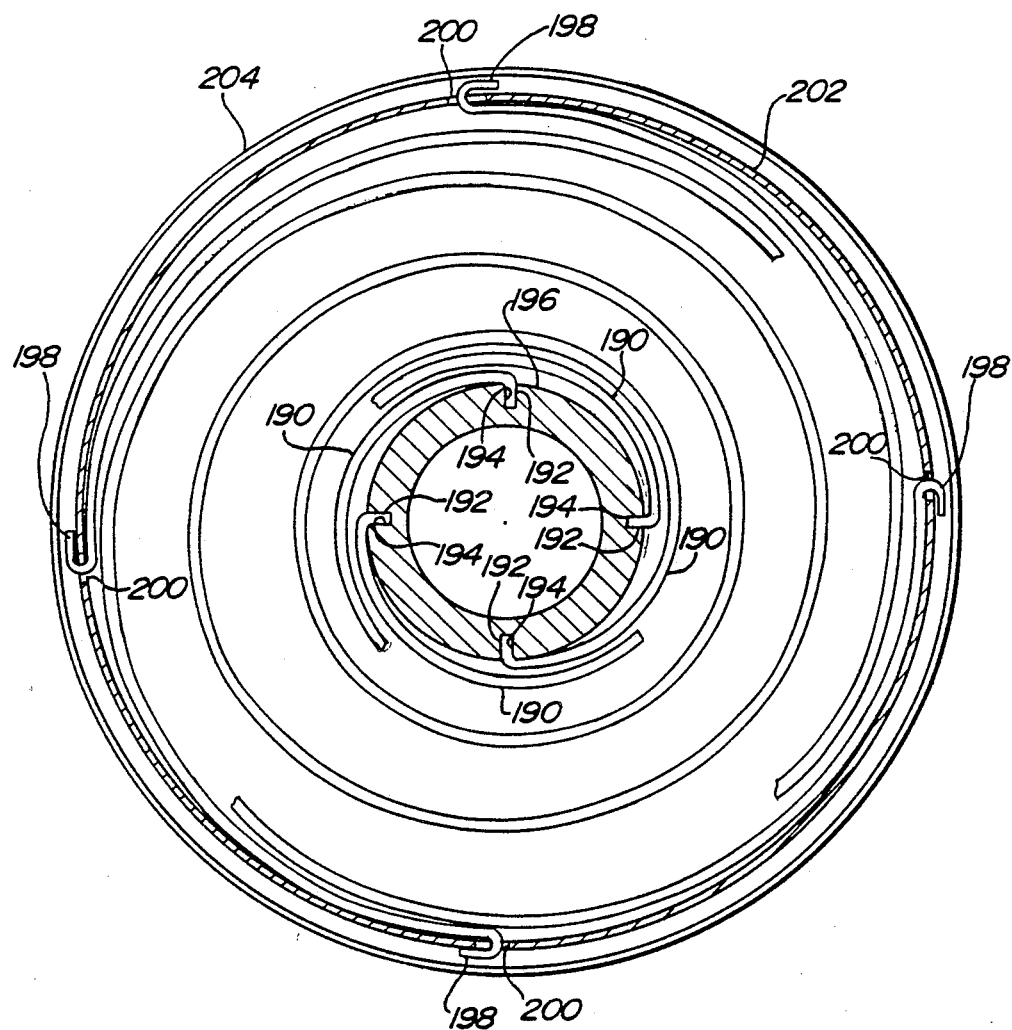
FIG. 7 is a cross-sectional side view showing an alternate embodiment using spiral springs.

The embodiment of the variable diameter pulley shown in FIG. 7 is similar to that shown in FIGS. 5 and 6. However, in this embodiment mounting tabs 192 at the internal ends of the spiral springs 190 are received in slots 194 provided in a hub 196. Hooks 198 provided at the opposite ends of the spiral springs 190 are received in slots 200 provided in torque rim 202 which is attached to one of the inner disk members 44 or 46. In this embodiment, the hub 196 is equivalent to the hub 84 shown in FIG. 5 and the torque rim 202 is equivalent to the torque rim 96. An annular cover 204, such as the annular cover 98 shown in FIG. 6, may be used to shield the spiral springs 190 from atmospheric contamination and to hold them in place.

The operation of the embodiment shown in FIG. 7 is identical to the embodiments shown in FIGS. 4, 5 and 6.

Figure 8:
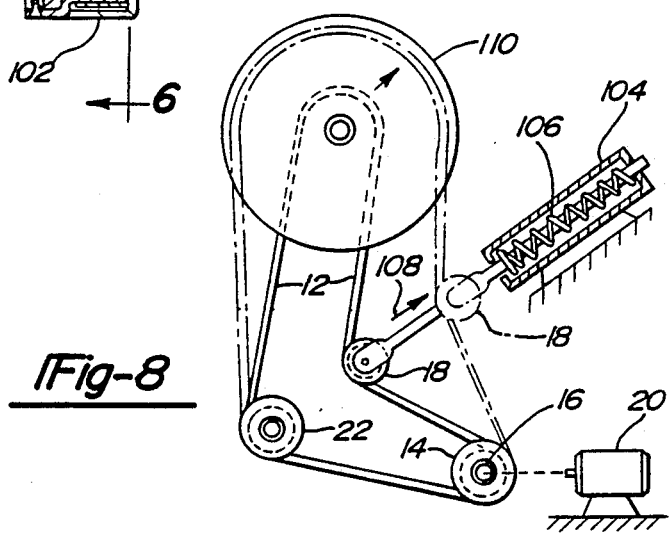
FIG. 8 is a side view of a second embodiment of the continuously variable transmission system.

An alternate embodiment of the continuously variable transmission system is shown in FIG. 8. In this embodiment, the belt engaging members 54 of a variable diameter pulley 110 are resiliently biased inwardly in a radial direction towards the axis of rotation to their minimum radial extent by spring members, such as the coil springs 56 or 66 as shown in the embodiments illustrated in FIGS. 2 and 4 or by the spiral springs 90 or 190 as illustrated in FIGS. 6 and 7, respectively. Weights, as shall be explained relative to FIG. 9, may be added to the ends of the belt engaging members 54. The weights increase the centrifugal forces acting on the belt engaging members 54 when the variable diameter pulley 110 is rotated, urging the belt engaging members 54 outwardly towards their maximum radial extent. As is known in the art, the centrifugal forces urging the belt engaging members are a function of the weight of the weighted belt engaging members 54, the radial distance from the axis of rotation and the square of the rotational velocity of the variable diameter pulley.

In the discussion of FIG. 8, the elements which are the same as those shown in FIG. 1 have the same reference numerals. The variable diameter pulley 110 is driven by a source of rotary power (not shown) which produces a torque rotating the variable diameter pulley 110. The drive belt 12 transfers the rotational torque of the variable diameter pulley 110 to at least a second pulley such as fixed diameter pulley 14 whose output shaft 16 is connected to the driven device 20. As in the previous embodiment of the continuously variable transmission system, the driven device 20 may be any type of device responsive to a rotary input to perform a desired function. It is also to be understood that in any given practical application, the drive belt 12 may engage two or more driven devices as shown in FIG. 13.

The tensioner pulley 18 is biased by a resilient actuator 104 having a resilient member, such as a coil spring 106, to produce a tension on the drive belt 12 so that the fixed diameter pulley 14 attached to the driven device will rotate with the rotation of the variable diameter pulley assembly 110. The continuously variable transmission system may also include other pulleys, such as the idler pulley 22, for purposes well known in the art.

In the initial state of the continuously variable transmission system, as shown in FIG. 8, the belt engaging members of the variable diameter pulley 110 are resiliently biased to their innermost radial positions and the resilient actuator 104 is in its extended state. In the extended state of the resilient actuator 104, the tensioner pulley 18 takes up the slack in the drive belt 12 and produces a desired tension so that the friction between the drive belt 12, the belt engaging members 54 of the variable diameter pulley 110 and the fixed diameter pulley 14 is sufficient to cause the fixed diameter pulley to rotate with a rotation of the variable diameter pulley 110. As the rotational velocity of the variable diameter pulley increases, the weighted belt engaging members 54 will be urged outwardly in a radial direction by centrifugal forces. When the centrifugal forces acting on the weighted belt engaging members 54 exceed the forces of the resilient springs of the variable diameter pulley 110 which are urging the belt engaging members towards their innermost radial position and the forces exerted by the tensioner pulley 18 on the drive belt 12, the weighted belt engaging members will be displaced outwardly until the opposing forces are balanced.

The spring rate of the springs embodied in the variable diameter pulley 110 and the spring rate of the spring 106 in the resilient actuator 104 are selected so that at a predetermined rotational velocity of the variable diameter pulley 110, the weighted belt engaging members 54 will be displaced to their maximum radial extent and the tensioner pulley 18 will be displaced from its initial position in the direction indicated by the arrow 108 to the position shown in phantom. The path of the drive belt 12, when the weighted belt engaging members 54 are in their outermost radial position, is indicated by the phantom lines.

This embodiment of the variable speed transmission system reduces the torque required to initiate the rotation of the driven device, by eliminating the need for the source of rotary power to produce a high torque at low speeds.

The details of a first embodiment of the variable diameter pulley 110 are shown in FIG. 9. The basic configuration of the variable diameter pulley is identical to that shown in FIG. 2. The same reference numerals are used to identify the elements of the variable diameter pulley 110 which are identical to those of the variable diameter pulley 10 shown in FIG. 2.

In particular, the outer disk members 40 and 42 are fixedly attached to the hub 26 which is attached to the shaft 30 by the bolt 32. The inner disk members 44 and 46 are fixedly attached to the spacer sleeve 48 which circumscribes the hub 26 and is rotatable relative thereto. The coil spring 56 circumscribes the spacer sleeve 48 between the inner disk members 44 and 46. The first end 58 of the coil spring 56 is connected to the inner disk member 44 while the opposite end 60 is connected to the outer disk member 42 through the arcuate aperture 62. However, in the variable diameter pulley 110, the coil spring 56 is prewound in the direction which produces a force rotating the inner disk members 44 and 46 in a direction relative to the outer disk members 40 and 42 which displaces the belt engaging members 54 to their innermost radial positions as shown.

A weight 112 is attached to the ends of the belt engaging member 54. The weights 112 may be attached to all of the belt engaging members as shown, or may be attached to only selected belt engaging members 54 in a pattern symmetrical about the hub's axis of rotation. Alternatively, the mass of the belt engaging members themselves may be increased eliminating the need for the additional weights added to their ends. As used herein, the term weighted belt engaging members includes both increasing the mass of the belt engaging members and adding weights to the ends of the belt engaging members, as shown in FIG. 9.

The number of weights 112 and their individual masses are selected so that at a predetermined rotational velocity the centrifugal forces generated are sufficient to overcome the force of the coil spring 56 acting on the inner and outer disk members and the tension force applied to the drive belt 12 by the spring 106, permitting the weighted belt engaging members to be displaced outwardly in a radial direction increasing the effective diameter of the variable diameter pulley 110. The effective diameter of the variable diameter pulley 110 will increase in a continuous manner as its rotational velocity increases until the weighted belt engaging members 54 reach their maximum radial extent.

Obviously, as the rotational velocity of the variable diameter pulley decreases, the forces produced by the coil spring 56 and the tensioner pulley 18 on the drive belt 12 will exceed the centrifugal forces acting on the weighted belt engaging members 54 and they will be displaced radially inwardly until the opposing forces again come to balance.

The variable diameter pulley 110 may also have a pair of annular housing members 114 enclosing the weights 112 located on the outside of the outer disk members 40 and 42. The housing members 114 have a rim portion 116 peripherally attached to the inner disk members 44 and 46. The housing members 114 act as a dirt shield preventing dust and dirt from accumulating between the adjacent inner and outer disk members as well as protecting the weights 112. Alternatively, the housing members may be attached to the hub 26 or the periphery of the outer disk members 40 and 42.

Those skilled in the art will recognize that the coil spring 56 of the variable diameter pulley 110 may be located outside of the region between the inner disk members 44 and 46, as shown in FIG. 4, without affecting its operation.

FIG. 10 shows an alternate embodiment of the variable diameter pulley 110 in which the coil spring 56 or 66 is replaced by two or more spiral springs such as the spiral springs 90 shown in FIGS. 5 and 6. In this embodiment, the spiral springs 90 spiral in the reverse direction so as to rotate the inner disk members 44 and 46 in a direction displacing the belt engaging members 54 to their innermost radial positions, as shown.

The elements of the embodiment of the variable diameter pulley 110 shown in FIG. 10 which are identical to those described relative to the variable diameter pulley 110 shown in FIGS. 5 and 6 have the same reference numerals. Referring to FIG. 10, the outer disk members 40 and 42 are connected to the hub 84 while the inner disk members 44 and 46 are connected to the spacer sleeve 48 circumscribing the hub 84 and rotatable thereabout. The hub 84 is attached to a shaft 30 by the bolt 32. The hub 84 and the shaft 30 have mating splines as discussed relative to FIGS. 5 and 2 to assure rotation of the variable diameter pulley 110 with a rotation of the shaft 30. The spring flange 86 is attached to the hub 84 and supports the plurality of spring posts 88. A spiral spring 90 is attached to each of the spring posts 88. Each spiral spring 90 has a hook provided at its external end which is attached to the torque rim 96. The torque rim 96 is attached to the peripheral edge of the inner disk member 44 and is rotatable therewith. The spiral springs 90 and a portion of the torque rim 96 are enclosed by the annular cover member 98 attached to the hub 84 to protect the spiral springs from environmental contamination.

As in the embodiment shown in FIG. 9, the variable diameter pulley 110 shown in FIG. 10 has a plurality of weights 112 attached to the ends of the belt engaging members 54. The weights 112 may be attached to only one end of the belt engaging members as shown in FIG. 10, may be attached to both ends of the belt engaging members as shown in FIG. 9, or included in the mass of the belt engaging members 54 as previously discussed. Further, weights may be attached to each belt engaging member 54 or may be attached to selected belt engaging members 54 in a pattern symmetrical about the axis of rotation.

The operation of the embodiment shown in FIG. 10 is identical to the operation of the embodiment shown in FIG. 9 and discussed relative to the continuously variable transmission system shown in FIG. 8.

Those skilled in the art will recognize that the spiral springs 90 of the variable diameter pulley 110 may be replaced by spiral springs 190 as shown in FIG. 7 without affecting its operation.

An alternate embodiment of the variable diameter pulley 110 is shown in FIG. 11. In this embodiment, the weights are removed from the ends of the belt engaging members 54 and are used to independently rotate the inner disk members 44 and 46 relative to the outer disk members 40 and 42. Referring to FIG. 11, the outer disk members 40 and 42 are attached to the hub 26 while the inner disk members 44 and 46 are attached to the spacer sleeve 48 which circumscribes the hub 26 and is rotatable thereabout. The hub 26 is secured to the end of the shaft 30 by means of the bolt 32. Mating male and female splines provided on the shaft and the hub, respectively, lock the variable diameter pulley 110 to the shaft 30 for rotation therewith. The coil spring 56 connected between one of the inner disk members 44 or 46 and one of the outer disk members 40 or 42 produces a force rotatably displacing the inner disk members 44 and 46 relative to the outer disk members 40 and 42 so that the belt engaging members are displaced to their maximum radial positions as shown. Alternatively, the coil spring 56 may produce a force biasing the inner disk members 44 and 46 to rotate in a direction relative to the outer disk members 40 and 42 to displace the belt engaging members 54 to their minimum radial positions as shall be discussed hereinafter.

A first weight guideway flange 117 is attached to the outer disk member 40 and is rotatable therewith. The first weight guideway flange 117 has a plurality of first weight guideways 122 which extend radially outwardly in a first direction. A second weight guideway flange 118 is connected to an annular cover member 126 which, in turn, is connected to the peripheral edge of the inner disk member 44 and is rotatable therewith. The second weight guideway flange 118 has a plurality of second weight guideways 124 which also extend radially outward but in a direction opposite to the first weight guideways so that the first and second weight guideways cross at a predetermined location determined by the rotational orientation of the second weight guideway flange 118 relative to the first weight guideway flange 117. The shapes of the first and second weight guideways 122 and 124 generally correspond to the shapes of the plurality of guideways 50 and 52 shown in FIG. 2.

A plurality of weights 120 are slidably disposed between the first and second weight guideway flanges 117 and 118. Each weight has a pair of journals 128, one of which is received in the first weight guideway 122 and the other of which is received in the second weight guideway 124. The radial position of the weight 120 determines the rotational orientation of the first weight guideway flange 117 relative to the second weight guideway flange 118. Since the first weight guideway flange 117 is connected to the outer disk member 40 and the second weight guideway flange 118 is connected to the inner disk member 44, the position of the weight 120 determines the rotational orientation between the outer disk members 40 and 42 and the inner disk members 44 and 46.

In the rest state of the variable diameter pulley 110, the coil spring 56 produces a force rotating the inner disk members 44 and 46 relative to the outer disk members 40 and 42, displacing the plurality of belt engaging members 54 to their maximum radial extent. The rotation of the inner disk members 44 and 46 by the coil spring 56 also rotates the first weight guideway flange 117 relative to the second weight guideway flange 118, displacing the plurality of weights 120 to their minimum radial extent.

In operation, when the rotational velocity of the variable diameter pulley 110 exceeds a predetermined velocity, the plurality of weights 120 will produce a centrifugal force which exceeds the force generated by the coil spring 56 which holds the plurality of weights in their innermost radial position. The pair of journals 128 of each of the plurality of weights 120 will traverse outwardly in the first and second weight guideways 122 and 124, respectively, rotating the second weight guideway flange 118 relative to the first weight guideway flange 117. The rotation of the first and second guideway flanges 117 and 118 relative to each other rotates the inner disk members 44 and 46 relative to the outer disk members 40 and 42, displacing the plurality of belt engaging members 54 inwardly in a radial direction, reducing the effective diameter of the variable diameter pulley 110.

As indicated earlier, if the coil spring 56 produces a force rotating the inner disk members 44 and 46 relative to the outer disk members 40 and 42 in a direction displacing the plurality of belt engaging members 54 to their minimum radial extent, the direction of the first and second weight guideways 122 and 124 are reversed so that the plurality of weights 120 are also displaced to their minimum or innermost radial positions. Thus, when the rotational speed of the variable diameter pulley 110 exceeds a predetermined speed, the centrifugal forces produced by the plurality of weights 120 will cause the plurality of weights to be displaced radially outwardly as before. Now the first and second guideway flanges 117 and 118 and the inner disk members 44 and 46 and the outer disk members 40 and 42 will be rotated in a direction displacing the plurality of belt engaging members 54 outwardly in a radial direction, increasing the effective diameter of the variable diameter pulley. As is apparent to those skilled in the art, the effective diameter of the variable diameter pulley 110 shown in FIG. 11 is a function of its rotational speed. The effective diameter of the variable diameter pulley 110 will decrease as the rotational speed of the variable diameter pulley increases when the elements are arranged as shown in FIG. 11. However, as discussed above, the effective diameter of the variable diameter pulley 110 shown in FIG. 11 may increase as the rotational speed increases when the forces produced by the coil spring 56 are reversed to bias the plurality of belt engaging members 54 to their innermost radial position and the directions of the first and second weight guideways are reversed so that the plurality of weights are also displaced to their innermost radial positions.

Those skilled in the art will recognize that the spiral springs 90 shown in FIG. 12 may be replaced with the spiral springs 190 shown in FIG. 7 without affecting the operation of the variable diameter pulley 110.

FIG. 12 shows an alternate embodiment of the variable diameter pulley 110 shown in FIG. 11 in which the coil spring 56 is replaced by a plurality of spiral springs 90 as shown and described relative to FIGS. 5 and 10. The operation of the embodiment shown in FIG. 12 is identical to that shown in FIG. 11 and may be adapted to have its effective diameter change as a direct or inverse function of the rotational speed of the variable diameter pulley.

FIG. 13 shows a continuously variable transmission system in a typical automotive application. In the application the drive belt 12 is connected to a plurality of pulleys connected to different driven devices. In FIG. 13, pulley 130 drives an air pump 132, pulley 134 drives an alternator 136, pulley 138 drives an air conditioner compressor 140, pulley 142 drives a power steering fluid pump 144 and pulley 146 drives the engine's water pump 148. An actuator 150 is connected to a tensioner pulley 152 to maintain tension on the drive belt 12. The actuator 150 may be an externally powered actuator, such as the hydraulic or pneumatic actuator 24 shown in FIG. 1 or a resilient actuator such as the spring 106 shown in FIG. 8. The variable diameter pulley 154 may be a variable diameter pulley 10 or a variable diameter pulley 110 as discussed relative to FIGS. 1 and 8, respectively. It is also recognized that any one of the pulleys 130, 134, 138, 142 or 146 may also be a variable diameter pulley 10 or 110.

Having described various embodiments of the variable diameter pulley assembly, it is recognized that those skilled in the art are capable of generating still further embodiments of pulley structural relationships and principles of operations disclosed herein and set forth in the appended claims.

What is claimed is:

1. A continuously variable transmissional system comprising:
    a variable diameter pulley having a plurality of resiliently biased belt engaging members arranged in a circular pattern about an axis of rotation, the diameter of said circular pattern being the effective diameter of said variable diameter pulley, said plurality of belt engaging members being displaceable in a radial direction between a minimum and a maximum radial position in response to radial forces acting on said plurality of resiliently belt engaging members to vary said effective diameter;
    at least one other pulley;
    a drive belt connecting said variable diameter pulley with said at least one other pulley for rotation therewith;
    belt tensioner means for producing a force for maintaining at least a minimum tension force on said drive belt; and
    means for changing the radial forces acting on said plurality of belt engaging members to change the radial positions of said plurality of belt engaging members, thereby changing the effective diameter of said variable diameter pulley.

2. The transmission system of claim 1 wherein said plurality of resiliently biased belt engaging members of said variable diameter pulley are resiliently biased to said maximum radial position and wherein said means for changing the radial forces acting on said plurality of resiliently biased belt engaging members is an actuator connected to said belt tensioner means, said actuator displacing said belt tensioner means in a direction which increases the tension on said drive belt, said increased tension on said drive belt increasing the radial forces acting on said plurality of resiliently biased belt engaging members, urging said plurality of resiliently biased belt engaging members inwardly to reduce the effective diameter of said variable diameter pulley.

3. The transmission system of claim 2 wherein said variable diameter pulley comprises:

a hub having an axis of rotation;

a first pair of juxtapositioned disk members rotatable relative to each other about said axis of rotation, said first pair of disk members cooperating with each other to form a first plurality of through apertures in a circular pattern concentric with said axis of rotation, the diameter of said circular pattern being variable as a function of the rotational orientation of said first pair of disk members relative to each other, one end of each of said plurality of resiliently biased belt engaging members being received and supported in a respective one of said first plurality of through apertures, one disk member of said first pair of disk members being attached to said hub;

a second pair of juxtapositioned disk members spatially separated from said first pair of disk members, said second pair of disk members being rotatable relative to each other and cooperating with each other to form a second plurality of through apertures in a circular pattern concentric with said axis of rotation, the diameter of said circular pattern being variable as a function of the rotational orientation of said second pair of disk members relative to each other, the other ends of each of said plurality of resiliently biased belt engaging members being received in a respective one of said second plurality of through apertures, one disk member of said second pair of disk members being connected to said hub and the other disk member of said second pair of disk members being connected to the other disk member of said first pair of disk members; and means for resiliently biasing said other disk members of said first and second pair of disk members to rotate in a predetermined direction relative to said one disk member of said first and second pair of disk members to radially displace said plurality of resiliently biased belt engaging members to said maximum radial position.

4. The transmission system of claim 3 wherein said means for resiliently biasing is a coil spring concentric with said hub, said coil spring having one end attached to said one disk member of said first and second pair of disk members and the other end connected to said other disk member of said first and second pairs of disk members.

5. The transmission system of claim 4 wherein said coil spring is disposed between said first and second pair of disk members.

6. The transmission system of claim 5 wherein said coil spring is disposed outside the region between said first and second pair of disk members.

7. The transmission system of claim 3 wherein said means for resiliently biasing comprises at least two spiral springs, one end of each of said at least two spiral springs being fixedly supported from said hub and the other end being connected to one of said other disk member of said first and second pair of disk members.

8. The transmission system of claim 3 wherein said means for resiliently biasing comprises:

a spring flange attached to said hub, said spring flange having at least two spring posts extending therefrom parallel to said axis of rotation;

a torque rim connected to one of said other disk member of said first and second pair of disk members and rotatable therewith; and at least two spiral springs, each of said at least two spiral springs having one end attached to a respective one of said spring posts and the other end attached to said torque rim, said at least two spiral springs producing a force urging said other disk members of said first and second pair of disk members to rotate relative to said one disk member of said first and second pair of disk members in said predetermined direction.

9. The transmission system of claim 3 wherein said means for resiliently biasing comprises:

a plurality of slots equally spaced around the periphery of said hub;

a torque rim connected to one of said other disk members of said first and second pair of disk members and rotatable therewith; and a plurality of spiral spring members, each spiral spring member having an inner end received in a respective one of said plurality of slots and an opposite end connected to said torque rim.

10. The transmission system of claim 3 wherein said one disk member of said first and second pair of disk members have a plurality of first radial slots extending in a first direction and said other disk member of said first and second pair of disk members has a plurality of second radial slots extending in a second direction, opposite said first direction, and wherein each of said first radial slots crosses a respective one of said second radial slots, said first and second plurality of through apertures being formed where said plurality of first radial slots cross said plurality of second radial slots.

11. The transmission system of claim 1 wherein said plurality of resiliently biased belt engaging members of said variable diameter pulley are resiliently biased to said minimum radial position, wherein said means for changing the radial forces acting on said plurality of resiliently biased belt engaging members is a plurality of weights mechanically linked to said plurality of resiliently biased belt engaging members, said plurality of weights being responsive to the rotation of said variable diameter pulley to produce a centrifugal force urging said plurality of resiliently biased belt engaging members to be displaced outwardly from said minimal radial position, said displacement of said plurality of resiliently biased belt engaging members increasing the effective diameter of said variable diameter pulley and wherein said belt tensioner means resiliently biases said drive belt to have a predetermined tension, said belt tensioner means being displaceable in response to the increased tension on said drive belt as said plurality of resiliently biased belt engaging members are displaced outwardly to compensate for the increase in the effective diameter of said variable diameter pulley as its rotational velocity is increased.

12. The transmission system of claim 11 wherein said plurality of weights are incorporated in the mass of said plurality of resiliently biased belt engaging members.

13. The transmission system of claim 11 wherein each of said plurality of resiliently biased belt engaging members has at least one of said plurality of weights attached to one end thereof.

14. The transmission system of claim 11 wherein each of said plurality of resiliently biased belt engaging members has one of said plurality of weights attached to each of its ends.

15. The transmission system of claim 11 wherein at least one of said plurality of weights is attached to a predetermined number of selected belt engaging members, said predetermined number of selected belt engaging members being symmetrically disposed about said axis of rotation.

16. The transmission system of claim 15 wherein one of said plurality of weights is attached to each end of said predetermined number of selected belt engaging members.

17. The transmission system of claim 11 wherein said variable diameter pulley comprises:
a hub concentric with said axis of rotation;
a first pair of juxtapositioned disk members rotatable relative to each other about said axis of rotation; said first pair of disk members cooperating with each other to form a first plurality of through apertures in a circular pattern concentric with said axis of rotation, the diameter of said circular pattern being variable as a function of the rotational orientation of said first pair of disk members relative to each other, one end of each of said plurality of resiliently biased belt engaging members being received and supported in a respective one of said through apertures, one disk member of said first pair of disk members being attached to said hub, the other disk member of said first pair of disk members being rotatable about said hub;
a second pair of juxtapositioned disk members spatially separated from said first pair of disk members along said axis of rotation, said second pair of disk members being rotatable relative to each other and cooperating with each other to form a second plurality of through apertures in a circular pattern concentric with said axis of rotation, the diameter of said circular pattern being variable as a function of the rotational orientation of said second pair of disk members relative to each other, the other ends of said plurality of resiliently biased belt engaging members being received and supported in a respective one of said second plurality of through apertures, one disk member of said second pair of disk members being attached to said hub and the other disk member of said first pair of disk members and rotatable therewith; and
means for resiliently biasing said other disk members of said first and second pair of disk members to rotate in a predetermined direction relative to said one disk member of said first and second pair of disk members to displace said plurality of resiliently biased belt engaging members to said minimum radial position.

18. The transmission system of claim 17 wherein each of said plurality of resiliently biased belt engaging members has at least one of said plurality of weights attached to one end thereof.

19. The transmission system of claim 17 wherein each of said plurality of resiliently biased belt engaging members has one of said plurality of weights attached to each of its ends.

20. The transmission system of claim 17 wherein at least one of said plurality of weights is attached to a predetermined number of selected belt engaging members, said predetermined number of selected belt engaging members being symmetrically disposed about said axis of rotation.

21. The transmission system of claim 20 wherein one of said plurality of weights is attached to each end of said predetermined number of selected belt engaging members.

22. The transmission system of claim 17 wherein each of said one disk member of said first and second pair of disk members has a plurality of first radial slots extending in a first direction, and wherein each of said other disk member of said first and second pair of disk members has a plurality of second radial slots extending in a second direction, said first and second radial slots crossing each other to form said first and second plurality of through apertures.

23. The transmission system of claim 17 wherein said means for resiliently biasing is a coil spring concentric with said hub, said coil spring having one end connected to one of said one disk members of said first and second pair of disk members and the other end connected to one of said other disk members of said first and second pair of disk members.

24. The transmission system of claim 23 wherein said coil spring is disposed in the region between said first and second pairs of disk members.

25. The transmission system of claim 23 wherein said coil spring is disposed adjacent to one of said first and second pairs of disk members outside the region between said first and second pairs of disk members.

26. The transmission system of claim 17 wherein said means for resiliently biasing comprises:
a spring flange attached to said hub;
at least two spring posts attached to said spring flange parallel to said axis of rotation and equally spaced thereabout;
a torque rim attached to one of said other disk members of said first and second pair of disk members and rotatable therewith; and
at least two spiral springs, each of said at least two spiral springs having one end connected to a respective one of said at least two spring posts and the other end connected to said torque rim, said at least two spiral springs producing a force on said torque rim urging said other disk members of said first and second pair of disk members to rotate relative to said one disk members of said first and second pair of disk members in said predetermined direction.

27. The transmission system of claim 17 wherein said means for resiliently biasing comprises:
a plurality of slots equally spaced around the periphery of said hub;
a torque rim attached to one of said other disk members of said first and second pair of disk members and rotatable therewith; and
a plurality of spiral springs, each spiral spring having an inner end received in a respective one of said plurality of slots and an opposite end connected to said torque rim.

28. The transmission system of claim 1 wherein said variable diameter pulley has two pairs of juxtapositioned disk members supporting the opposite ends of said plurality of resiliently biased belt engaging members, a first disk member of each pair of disk members being attached to a common hub and a second disk member of one of said pairs of disk members being connected to a second disk member of the other of said pair of disk members, and wherein said first disk members are resiliently biased to rotate relative to said second disk members and the rotational orientation of said first disk members relative to said second disk members is determinative of the effective diameter of said variable diameter pulley, said means for changing the radial forces comprising:

a first weight guideway flange connected to said hub and rotatable therewith, said first weight guideway flange having at least two symmetrically disposed first weight guideways extending radially outwardly in a first direction;

a second weight guideway flange connected to one of said second disk members, said second weight guideway having at least two symmetrically disposed second weight guideways extending radially in a second direction, each of said at least two second weight guideways crossing a respective one of said at least two symmetrically disposed first weight guideways at a radial distance which is a function of the rotational orientation of said first weight guideway flange with respect to said second weight guideway flange; and at least two weights, each of which has a pair of journals extending from the opposite sides thereof, one of the journals of each of said at least two weights being received in a respective one of said at least two symmetrically disposed first weight guideways and the other journal of each weight being received in a respective one of said at least two symmetrically disposed second weight guideways, said journals determining the radial location where said at least two symmetrically disposed first and second weight guideways cross and determining the rotational orientation of said first weight guideway flange relative to said second weight guideway flange and the rotational orientation of said first disk members relative to said second disk members.

29. The transmission system of claim 28 wherein said variable diameter pulley has a coil spring concentric with said axis of rotation, said coil spring having one end connected to one of said first disk members and an opposite end connected to one of said second disk members, said coil spring producing a force biasing said first disk members to rotate relative to said second disk members and said first weight guideway flange to rotate relative to said second weight guideway flange to displace said at least two weights towards said axis of rotation.

30. The transmission system of claim 28 wherein said coil spring is disposed between said two pairs of disk members.

31. The transmission system of claim 29 wherein said coil spring is disposed adjacent to one of said first disk members on the side opposite the juxtaposed second disk member.

32. The transmission system of claim 28 wherein said variable 2 diameter pulley further comprises:

a spring flange connected to said hub and rotatable therewith;

at least two spring posts attached to said spring flange in a symmetrical pattern about said axis of rotation;

a torque rim attached to one of said second disk members; and at least two spiral springs, each of said at least two spiral springs having its internal end connected to a respective one of said at least two spring posts and its external end attached to said torque rim, said at least two spiral springs producing a force urging said second disk members to rotate relative to said first disk members to displace said plurality of resiliently biased belt engaging members to one of said minimum and maximum radial positions.

33. The transmission system of claim 28 wherein said variable diameter pulley further comprises:

a plurality of slots equally spaced about the periphery of said hub;

a torque rim attached to one of said second disk members; and a plurality of spiral springs circumscribing said hub, each of said plurality of spiral springs having an internal end received in a respective one of said plurality of slots and an opposite end connected to said torque rim.

34. The transmission system of claim 28 wherein each of said first disk members of said two pairs of juxtaposed disk members has a plurality of first guideways extending radially in a first direction and each of said second disk members has a plurality of second guideways extending radially in a second direction, each of said plurality of second guideways crossing a respective one of said plurality of first guideways to form a plurality of through apertures passing through said juxtaposed first and second disk members and wherein said opposite ends of said plurality of resiliently biased belt engaging members are received in said plurality of through apertures to support said plurality of resiliently biased belt engaging members.

35. A variable diameter pulley comprising:

a plurality of belt engaging members arranged in a circular pattern about an axis of rotation, the diameter of said circular pattern defining the effective diameter of said variable diameter pulley;

a pair of spatially separated end supports connected to the ends of said plurality of belt engaging members to support them therebetween in said circular pattern, each end support of said pair of spatially separated end supports comprising a first disk member disposed normal to said axis of rotation and a second disk member juxtaposed and rotatable relative to said first disk member;

means for maintaining a fixed relationship between the diameter of said circular pattern and the rotational orientation of said second disk members relative to said first disk members such that a change in the rotational orientation between said first and second disk members will produce a corresponding change in the diameter of said circular pattern and vice versa; and resilient means connected between said first and second disk members for producing a force urging said second disk members to rotate relative to said first disk members to radially displace said plurality of belt engaging members and change the diameter of said circular pattern.

36. The variable diameter pulley of claim 35 wherein said means for maintaining comprises:

a plurality of first guideways provided in each of said first disk members, each of said plurality of first guideways extending radially in a first direction; and a plurality of second guideways provided in each of said second disk members, each of said plurality of second guideways extending radially in a direction opposite said first direction, each of said plurality of second guideways crossing a respective one of said plurality of first guideways to form a plurality of through apertures defining said circular pattern, each of said plurality of through apertures passing through said juxtaposed first and second disk members and receiving therein, respectively, one end of a respective one of said plurality of belt engaging members.

37. The variable diameter pulley of claim 35 wherein said first disk members are connected to a common hub and rotate together as a unit and said second disk members are connected to a sleeve circumscribing said hub, said sleeve and second disk members being rotatable as a unit about said hub, said resilient means comprising a coil spring concentric with said axis of rotation, said coil spring having a first end connected to at least one of said first disk members and an opposite end connected to at least one of said second disk members and producing a force urging said disk members to rotate in a predetermined direction relative to said second disk members.

38. The variable diameter pulley of claim 37 wherein said predetermined direction is a direction displacing said plurality of belt engaging members radially away from said axis of rotation.

39. The variable diameter pulley of claim 37 wherein said predetermined direction is a direction displacing said plurality of belt engaging members radially towards said axis of rotation.

40. The variable diameter pulley of claim 39 further comprising weights added to selected ones of said plurality of belt engaging members, said selected ones of said plurality of belt engaging members being disposed in a symmetrical pattern about said axis of rotation.

41. The variable diameter pulley of claim 40 wherein said weights are incorporated in the mass of said selected ones of said plurality of belt engaging members.

42. The variable diameter pulley of claim 40 wherein said weights are attached to at least one end of each said selected ones of said plurality belt engaging members.

43. The variable diameter pulley of claim 42 wherein said weights are attached to both ends of said selected ones of said plurality of belt engaging members.

44. The variable diameter pulley of claim 42 further comprising weights attached to at least one end of each belt engaging member of said plurality of belt engaging members.

45. The variable diameter pulley of claim 42 further comprising weights attached to each end of each belt engaging member of said plurality of belt engaging members.

46. The variable diameter pulley of claim 39 wherein said coil spring circumscribes said sleeve between said second disk members.

47. The variable diameter pulley of claim 39 wherein said coil spring circumscribes said hub adjacent to one of said first disk members on the side opposite said juxtapositioned second disk member.

48. The variable diameter pulley of claim 35 wherein said first disk members are attached to a hub and said second disk members are connected to a sleeve circumscribing said hub and rotatable therearound, said resilient means comprising:
a spring flange connected to said hub normal to said axis of rotation;
at least two spring posts attached to said spring flange symmetrically arranged about said axis of rotation;
a torque rim attached to the periphery of one of said second disk members; and
at least two spiral springs, each of said at least two spiral springs having its internal end attached to a respective one of said at least two spring posts and an external end connected to said torque rim, said at least two spiral springs being prewound to generate a force urging said torque rim and said second disk members to rotate in a predetermined direction relative to said first disk members.

49. The variable diameter pulley of claim 48 wherein said predetermined direction is a direction displacing said plurality of belt engaging members radially away from said axis of rotation.

50. The variable diameter pulley of claim 48 wherein said predetermined direction is a direction radially displacing said plurality of belt engaging members towards said axis of rotation.

51. The variable diameter pulley of claim 50 wherein a weight is attached to at least one end of each belt engaging member of said plurality of belt engaging members.

52. The variable diameter pulley of claim 35 wherein said first disk members are attached to a hub and said second disk members are connected to a sleeve circumscribing said hub, and rotatable therewith, said resilient means comprising:
a plurality of slots equally spaced about the periphery of said hub;
a torque rim attached to the periphery of one of said second disk members; and
a plurality of spiral springs circumscribing said hub, each of said plurality of spiral springs having an inner end received in a respective one of said plurality of slots and an opposite end connected to said torque rim.

53. The variable diameter pulley of claim 52 wherein a weight is added to selected ones of said plurality of belt engaging members arranged in a symmetrical pattern about said axis of rotation.

54. The variable diameter pulley of claim 51 wherein said weight is incorporated in said plurality of belt engaging members.

55. The variable diameter pulley of claim 51 wherein said weight is attached to at least one end of said selected ones of said plurality of belt engaging members.

56. The variable diameter pulley of claim 35 comprising: a hub concentric with said axis of rotation connected to said first disk members;
a sleeve circumscribing said hub between said first disk members and rotatable relative thereto, said sleeve being connected to said second disk members juxtaposed said first disk members;
a weight guideway flange connected to said hub, said weight guideway flange having at least two first weight guideways symmetrically disposed about said axis of rotation, said at least two first weight guideways extending radially in a first direction;
a second weight guideway flange spatially separated from said first weight guideway flange, said second weight guideway flange having a rim connected to the periphery of one of said second disk members and at least two second weight guideways extending radially in a second direction opposite said first direction, each of said at least two second weight guideways crossing a respective one of said at least two first weight guideways at a radial location which is a function of the rotational orientation of said first weight guideway flange relative to said second weight guideway flange; and at least two weights disposed between said first and second weight guideway flanges, each of said at least two weights having a pair of journals, one of said journals being received in said at least two first weight guideways and the other being received in said at least two second weight guideways, the radial location of said at least two weights determining the rotational orientation between said first and second weight guideway flanges and the rotational orientation of said first disk members relative to said second disk members.

57. The variable diameter pulley assembly of claim 56 wherein said first and second directions of said at least two first and second weight guideways, respectively, are selected so that said at least two weights are displaced to a minimum radial position when said first and second disk members are rotated relative to each other by said resilient means to displace said plurality of belt engaging members to a maximum radial position.

58. The variable diameter pulley assembly of claim 56 wherein said first and second directions of said at least two first and second weight guideways are selected so that said at least two weights are displaced to a minimum radial position when said first and second disk members are rotated relative to each other by said resilient means to displace said plurality of belt engaging members to a minimum radial position.

59. The variable diameter pulley assembly of claim 56 wherein said resilient means is a coil spring having one end connected to at least one of said first disk members and the other end connected to at least one of said second disk members, said coil spring producing a force urging said first weight guideway flange to rotate relative to said second weight guideway flange to displace said at least two weights to their minimal radial position.

60. The variable diameter pulley of claim 56 wherein said resilient means comprises:
    a spring flange attached to said hub;
    a torque rim connected to one of said second disk members; and
    at least two spiral springs symmetrically disposed about said axis of rotation, each of said at least two spiral springs having an internal end connected to said spring flange and an external end connected to said torque rim, said at least two spiral springs being prewound to produce a force biasing said torque rim and said second weight guideway flange to rotate relative to said hub and said first weight guideway flange in a direction displacing said at least two weights inwardly to their minimum radial positions.

61. The variable diameter pulley of claim 56 wherein said resilient means comprises:
    a plurality of slots equally spaced about the periphery of said hub;
    a torque rim connected to one of said second disk members; and
    a plurality of spiral springs circumscribing said hub, each of said plurality of spiral springs having an inner end received in a respective one of said slots and an opposite end connected to said torque rim.

62. A variable diameter pulley comprising:
    a hub having an axis of rotation;
    a pair of spatially separated outer disk members connected to said hub normal to said axis of rotation;
    a sleeve circumscribing said hub between said pair of spatially separated outer disk members and being rotatable relative to said hub;
    a pair of inner disk members connected to said sleeve, each inner disk member being disposed adjacent to a respective one of said pair of outer disk members to form a pair of spatially separated side supports;
    a plurality of belt engaging members disposed between said spatially separated side supports in a circular pattern concentric with said axis of rotation, the ends of each of said plurality of belt engaging members being connected to said spatially separated side supports wherein the diameter of said circular pattern defines the effective diameter of said variable diameter pulley;
    means responsive to the rotational displacement of said pair of inner disk members relative to said pair of outer disk members for radially displacing said plurality of belt engaging members; and
    resilient means generating a force biasing said pair of inner disk members to rotate relative to said pair of outer disk members to displace said plurality of belt engaging members in a predetermined direction.

63. The variable diameter pulley of claim 62 wherein said resilient means is a coil spring concentric with said axis of rotation, said coil spring having one end connected to at least one of said pair of outer disk members and the other end connected to at least one of said pair of inner disk members.

64. The variable diameter pulley of claim 62 wherein said resilient means is at least two spiral springs radially spaced from said axis of rotation in a symmetrical pattern, each of said at least two spiral springs having an internal end connected to said hub and an external end connected to one inner disk member of said pair of inner disk members.

65. The variable diameter pulley of claim 62 wherein said resilient means comprises at least two spiral springs circumscribing said hub, in a symmetrical pattern, each of said at least two spiral springs having an internal end connected to said hub and an external end connected to one of said inner disk members of said pair of inner disk members.

66. The variable diameter pulley of claim 62 wherein said resilient means produces a force rotating said pair of inner disk members relative to said pair of outer disk members in a direction radially displacing said plurality of belt engaging members towards said axis of rotation, said variable diameter pulley further comprising a plurality of weights, at least one of said plurality of weights being connected to an end of a predetermined number of selected belt engaging members symmetrically spaced about said axis of rotation.

67. The variable diameter pulley of claim 66 wherein each selected belt engaging member has an added weight.

68. The variable diameter pulley of claim 67 wherein said added weight is a weight connected to at least one end of each of said selected belt engaging members.

69. The variable diameter pulley of claim 67 wherein said added weight is an increase in the mass of each of said selected belt engaging members.

70. The variable diameter pulley of claim 66 wherein said predetermined number of selected belt engaging members includes all of said plurality of belt engaging members.

71. The variable diameter pulley of claim 62 further comprising:

a first weight guideway flange connected to said hub, said first weight guideway flange having at least two symmetrically disposed first weight guideways radially extending in a first direction;

a second weight guideway flange spatially separated from said first weight guideway flange and connected to one inner disk member of said pair of inner disk members, said second weight guideway flange having at least two symmetrically disposed second guideways radially extending in a second direction, each of said at least two second guideways crossing a respective one of said at least two first guideways, the radial location where said at least two first and second weight guideways cross determining the rotational orientation of said first weight guideway flange relative to said second weight guideway flange;

at least two weights disposed between said first and second weight guideway flanges, each of said at least two weights having a pair of journals extending from opposite sides thereof, one journal of said pair of journals being received in one of said at least two first weight guideways and the other journal of said pair of journals being received in one of said at least two second weight guideways, said journals determining the radial location where said at least two first and second weight guideways cross, said at least two weights being responsive to the rotational velocity of 22 said variable diameter pulley to be radially displaced outwardly from said axis of rotation; and wherein said resilient means produces a force rotating said pair of inner disk members relative to said pair of outer disk members in a direction biasing said at least two weights to be displaced towards said axis of rotation.

72. The variable diameter pulley of claim 62 wherein said means for radially displacing said plurality of belt engaging members comprises:

a plurality of symmetrically disposed first guideways provided in each inner disk member of said pair of inner disk members, said plurality of first guideways radially extending in a first direction; and a plurality of symmetrically disposed second guideways provided in each outer disk member of said pair of outer disk members, said plurality of second guideways radially extending in a second direction, opposite said first direction, each of said plurality of second guideways crossing a respective one of said plurality of first guideways forming a plurality of through apertures in said circular pattern passing through said adjacent pair of inner and outer disk members, each of said plurality of through apertures receiving therein an end of one of said plurality of belt engaging members.

* * * * *

UNITED STATES PATENT AND TRADEMARK OFFICE
CERTIFICATE OF CORRECTION

PATENT NO. : 4,990,123

DATED : February 5, 1991

INVENTOR(S) : Werner Krude

It is certified that error appears in the above-identified patent and that said Letters Patent is hereby corrected as shown below:

Column 19, line 14, after "guideway" insert --flange--.

Column 19, line 59, delete "2", wording on line 59 to immediately follow wording on line 58.

Column 21, line 19, after "said" insert --first--.

Column 26, line 1, delete "22".

Signed and Sealed this

Fourteenth Day of July, 1992

Attest:

DOUGLAS B. COMER

Attesting Officer

Acting Commissioner of Patents and Trademarks